United States Patent
Kimura et al.

(10) Patent No.: US 11,882,040 B2
(45) Date of Patent: Jan. 23, 2024

(54) LOAD DISTRIBUTION SYSTEM AND LOAD DISTRIBUTION METHOD

(71) Applicant: Nippon Telegraph and Telephone Corporation, Tokyo (JP)

(72) Inventors: Akihiro Kimura, Musashino (JP); Shinya Kawano, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 206 days.

(21) Appl. No.: 17/427,689

(22) PCT Filed: Jan. 22, 2020

(86) PCT No.: PCT/JP2020/002192
§ 371 (c)(1),
(2) Date: Aug. 2, 2021

(87) PCT Pub. No.: WO2020/162185
PCT Pub. Date: Aug. 13, 2020

(65) Prior Publication Data
US 2022/0131804 A1    Apr. 28, 2022

(30) Foreign Application Priority Data
Feb. 5, 2019 (JP) ................ 2019-019173

(51) Int. Cl.
*H04L 47/125* (2022.01)
*H04L 45/24* (2022.01)
*H04L 47/70* (2022.01)

(52) U.S. Cl.
CPC ........... *H04L 47/125* (2013.01); *H04L 45/24* (2013.01); *H04L 47/823* (2013.01)

(58) Field of Classification Search
CPC ..... H04L 47/125; H04L 45/24; H04L 47/823; H04L 61/2514; H04L 61/2517
See application file for complete search history.

(56) References Cited

U.S. PATENT DOCUMENTS

| 8,676,980 B2 * | 3/2014 | Kreeger | H04L 49/70 709/226 |
| 10,116,577 B2 * | 10/2018 | Ramalingam | H04L 45/125 |

(Continued)

FOREIGN PATENT DOCUMENTS

JP    2004350078    12/2004

OTHER PUBLICATIONS

Kimura et al., "A Loadbalancing Method of vCPE Server Using Flow Characteristics," Proceedings of the 2018 IEICE General Conference, Mar. 20, 2018, p. 90, 3 pages (With English Translation).

*Primary Examiner* — Kibrom T Hailu
(74) *Attorney, Agent, or Firm* — Fish & Richardson P.C.

(57) ABSTRACT

When the load becomes high, an identification unit (301) of a second packet forwarding device (30) identifies an application of a new flow. Then, a determination unit (302) determines whether or not distribution of new flow is necessary, based on the flow characteristic of the application and the type of the high load. Then, when distribution of the new flow is necessary, a decision unit (303) acquires a list of second packet forwarding devices (30) having a low load from the load monitoring device (10), and decides a second packet forwarding device (30) as the distribution destination. Then, a control unit (304) performs a route control for guiding the flow to the second packet forwarding device (30) which is the distribution destination.

12 Claims, 10 Drawing Sheets

(56) References Cited

U.S. PATENT DOCUMENTS

| | | | |
|---|---|---|---|
| 10,555,217 B2* | 2/2020 | Karino | H04L 47/31 |
| 2016/0048407 A1* | 2/2016 | Alicherry | H04L 43/20 |
| | | | 718/1 |
| 2016/0197845 A1* | 7/2016 | Puttaswamy Naga | H04L 45/42 |
| | | | 709/225 |
| 2017/0163724 A1* | 6/2017 | Puri | H04L 67/568 |
| 2018/0331961 A1* | 11/2018 | Lambeth | H04L 47/2441 |
| 2019/0182895 A1* | 6/2019 | Di Girolamo | H04L 67/148 |
| 2020/0092209 A1* | 3/2020 | Chen | H04L 41/0823 |

* cited by examiner

LOAD DISTRIBUTION SYSTEM AND LOAD DISTRIBUTION METHOD

CROSS-REFERENCE TO RELATED APPLICATIONS

This application is a National Stage application under 35 U.S.C. § 371 of International Application No. PCT/JP2020/002192, having an International Filing Date of Jan. 22, 2020, which claims priority to Japanese Application Serial No. 2019-019173, filed on Feb. 5, 2019. The disclosure of the prior application is considered part of the disclosure of this application, and is incorporated in its entirety into this application.

TECHNICAL FIELD

The present invention relates to a load balancing system and a load balancing method.

BACKGROUND ART

There has been known a technique for balancing the load of packet forwarding devices such as routers. For example, there is known a technique in which a plurality of packet forwarding devices and a plurality of forwarding paths are prepared as packet forwarding destinations, and traffic is evenly distributed across the respective forwarding paths to balance the load of the packet forwarding devices. Further, as such a load balancing technique, there is also known a technique called ECMP (Equal Cost Multi Path) or ECMP routing. ECMP is a load balancing technique for evenly distributing traffic across equal cost forwarding paths among the plurality of forwarding paths described above.

In a load balancing system using ECMP, there is known a technique for monitoring the output buffer of the output physical port of a packet forwarding device and switching the forwarding path when the usage amount of this output buffer or the packet flow rate exceeds a threshold value (e.g., PTL 1).

Indexes of the forwarding capacity in the packet forwarding device include an amount of data represented by bps (bits per second) for the forwarding capacity and a number of packets represented by pps (packets per second) for the forwarding capacity. Further, these forwarding capacities have an upper limit peculiar to the packet forwarding device. For example, in a case where a packet forwarding device is implemented using network virtualization technology, bps may be limited by the line rate of a physical NIC (Network Interface Card), and pps may be limited by the packet processing speed of software such as an OS (Operating System) or an application.

Since ECMP does not take into consideration the flow characteristics, that is, whether the flow is mainly of long packets or short packets, it may not be possible to make the most use of the forwarding capacity of the packet forwarding device when there is a deviation in the length of the packet forwarded by the packet forwarding device. Here, the flow refers to a packet (traffic) or a group of packets having the same flow information. The flow information is specified by the header information included in the packet, and refers to, for example, 5-tuple (source IP (Internet Protocol) address, destination IP address, source port number, destination port number, protocol type).

For example, traffic such as of moving images has the characteristic of having many long packets. Accordingly, when traffic such as of moving images is concentrated, the forwarding capacity of the amount of data is exhausted, while the forwarding capacity of packet numbers has still a margin. On the other hand, for example, traffic such as in VoIP (Voice over Internet Protocol) or telemetry has the characteristic of having many short packets. Accordingly, when traffic such as in VoIP and telemetry is concentrated, the forwarding capacity of the amount of data has still a margin, while the forwarding capacity of packet numbers is exhausted.

In view of such a situation, there is a technique for balancing the load in consideration of the flow characteristics. FIG. 10 is a diagram illustrating an example of a load balancing system for balancing the load in consideration of the flow characteristics (e.g., NPL 1). In FIG. 10, server #1 and server #2 are each a server 91. CPE #1 and CPE #2 are each piece of customer premises equipment (CPE) 92. Network #1 to network #3 are each a network 93.

The server 91 serves as a host for a vCPE (Virtualized CPE) that virtualizes some functions of the CPE 92. Packets to be forwarded from network #1 to network #3 are forwarded via CPE #1 and server #1 or server #2. In other words, a packet is forwarded via the CPE 92 serving as a first packet forwarding device and the server 91 serving as a second packet forwarding device.

A load monitoring device 94 monitors the load of the server 91 from the viewpoint of bps and pps (1), and notifies the CPE 92 of a load state when the load of the server 91 exceeds a predetermined threshold value (2). The CPE 92 stores the load state of each server 91 based on the notification. Then, in response to receiving a packet of a new flow from network #1, the CPE 92 identifies the application of the new flow and predicts the packet length based on the identified application.

Then, the CPE 92 selects a vCPE on the server 91 that has a low load from the viewpoint of bps when the CPE 92 predicts that the packet length will be long, and the CPE 92 selects a vCPE on the server 91 that has a low load from the viewpoint of pps when the CPE 92 predicts that the packet length will be short. Then, the CPE 92 forwards the packet to the selected server 91 (3).

CITATION LIST

Patent Literature

[PTL 1] Japanese Patent Application Publication No. 2004-350078

Non Patent Literature

[NPL 1] Akihiro Kimura, Katsuma Miyamoto, Shinya Kono, Hideo Tsuchiya, and Akihiro Okada, "*Furotokusei ni Motozuku vCPE Saba no Fukabunsan Housiki* (Load balancing Method for vCPE Server Based on Flow Characteristics)", Proceedings of the 2018 General Conference of the Institute of Electronics, Information and Communication Engineers, Vol. 2018 Communications (2), p. 90 b-6-90

SUMMARY OF THE INVENTION

Technical Problem

In the load balancing system illustrated in FIG. 10, the first packet forwarding device identifies the application of the new flow. Therefore, the load balancing system illustrated in FIG. 10 has a problem that the cost of the first packet forwarding device increases.

An embodiment of the present invention has been made in view of the foregoing, and an object thereof is to prevent an increase in the cost of the first packet forwarding device without the first packet forwarding device having to identify the application of a new flow.

Means for Solving the Problem

In order to achieve the above object, an embodiment of the present invention includes an identification unit that identifies an application of a new flow when a load is high in terms of data amounts or packet numbers; a determination unit that determines whether or not distribution of the new flow is necessary, based on a flow characteristic of the application identified by the identification unit and a determination whether or not the load is high in terms of the amount of data or packet numbers; a decision unit that decides a distribution destination when the determination unit determines that distribution of the new flow is necessary; and a control unit that performs control such that a packet of the new flow is forwarded via the distribution destination decided by the decision unit.

Effects of the Invention

An object is to prevent an increase in the cost of a first packet forwarding device without the first packet forwarding device having to identify an application of a new flow.

DESCRIPTION OF EMBODIMENTS

Hereinafter, embodiments of the present invention will be described. Note that in the following, it is assumed that the flow characteristics include a "high bps flow" indicating a flow having many long packets and a "high pps flow" indicating a flow having many short packets.

<Overall Configuration>

Figure 1:
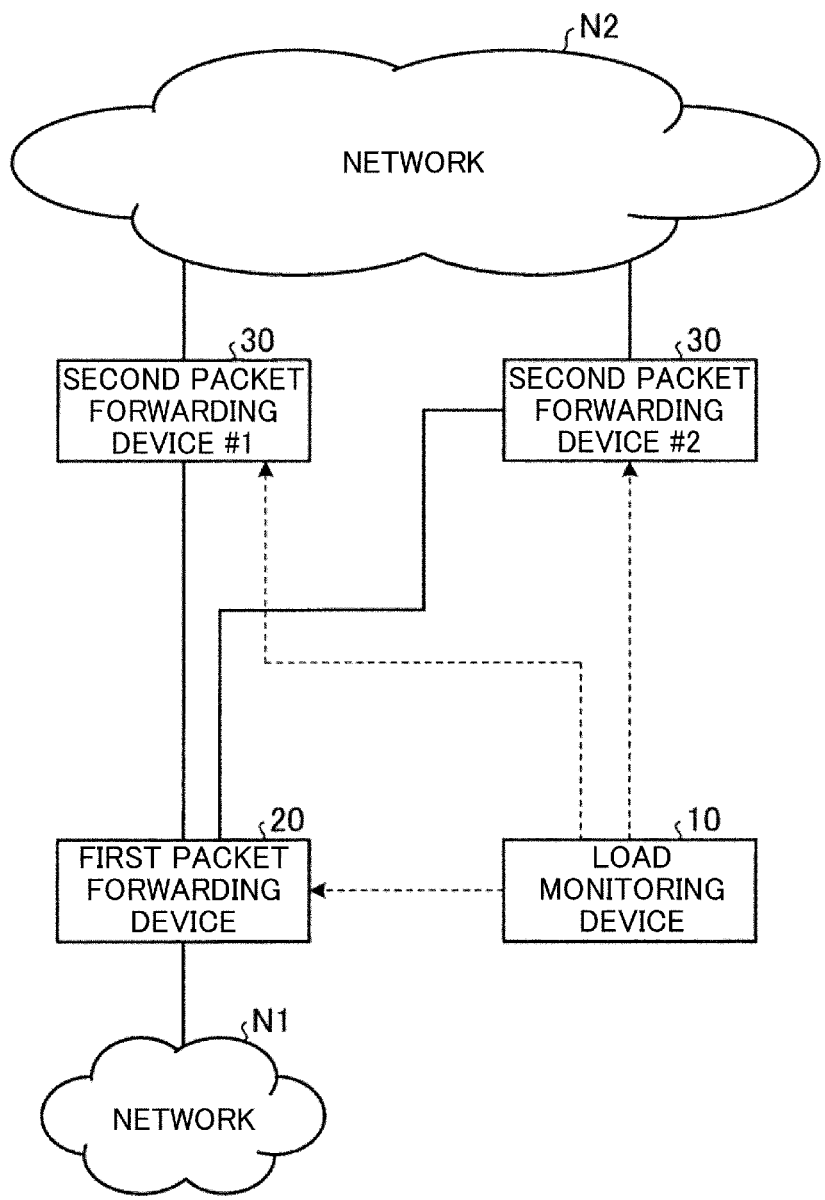
FIG. 1 is a diagram illustrating an example of the overall configuration of a load balancing system according to an embodiment of the present invention.

First, the overall configuration of a load balancing system 1 according to an embodiment of the present invention will be described with reference to FIG. 1. FIG. 1 is a diagram illustrating an example of the overall configuration of the load balancing system 1 according to the embodiment of the present invention.

As illustrated in FIG. 1, the load balancing system 1 according to the embodiment of the present invention includes a load monitoring device 10, a first packet forwarding device 20, and second packet forwarding devices 30.

The load monitoring device 10 is, for example, a computer or a computer system, and monitors the traffic flow rate of the second packet forwarding devices 30 whose load is to be balanced. The load monitoring device 10 monitors the load of the second packet forwarding device 30 from the viewpoint of bps and pps.

The first packet forwarding device 20 is, for example, a router or the like, and forwards a packet from a network N1 to the second packet forwarding devices 30. At this time, the first packet forwarding device 20 refers to a predetermined table used for load balancing to forward the packet to one second packet forwarding device 30 of the plurality of second packet forwarding devices 30.

Each second packet forwarding device 30 is, for example, a router or the like, and forwards the packet forwarded from the first packet forwarding device 20 toward a network N2. The second packet forwarding device 30 identifies an application of a new flow when the load is high in terms of data amounts (bps) or packet numbers (pps). Then, the second packet forwarding device 30 determines whether or not distribution of the new flow t is necessary, based on the type of the high load and the flow characteristics of the identified application. Here, the type of the high load indicates which of data amounts or packet numbers is used to determine the high load.

Then, when the second packet forwarding device 30 determines that the distribution of the new flow is necessary, the second packet forwarding device 30 decides another second packet forwarding device 30 as the distribution destination, and performs a route control so that the packets of the new flow are forwarded via the decided second packet forwarding device 30.

Note that in the following, when the plurality of second packet forwarding devices 30 are distinguished from each other, they are referred to as "second packet forwarding device #1", "second packet forwarding device #2", and the like. Further, the configuration of the load balancing system 1 illustrated in FIG. 1 is an example, and other configurations may be used. For example, the first packet forwarding device 20 and the second packet forwarding devices 30 may be virtual routers or the like constructed on a computer or the like by network virtualization technology. Further, there may be three or more second packet forwarding devices 30.

First Embodiment

Hereinafter, a first embodiment of the load balancing system 1 according to the embodiments of the present invention will be described.

<Route Control>

Figure 2:
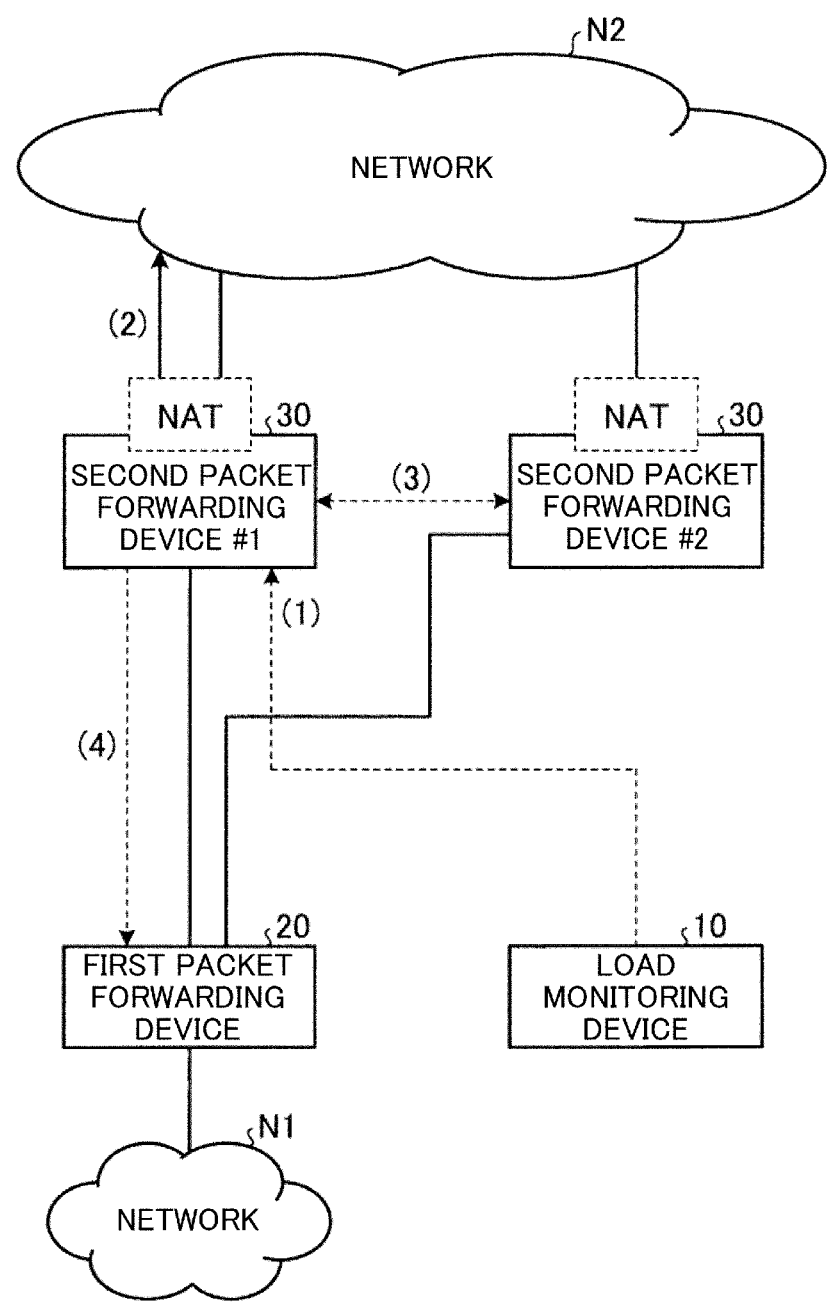
FIG. 2 is a diagram illustrating an example of a route control when a second packet forwarding device in a first embodiment determines that distribution of a new flow is necessary.

First, a route control when a second packet forwarding device 30 in the first embodiment determines that distribution of a new flow is necessary will be described with reference to FIG. 2. FIG. 2 is a diagram illustrating an example of a route control when a second packet forwarding device 30 in the first embodiment determines that distribution of a new flow is necessary. As illustrated in FIG. 2, second packet forwarding device #1 acquires the source IP (Internet Protocol) address in NAT (Network Address Translation) of second packet forwarding device #2 from the load monitoring device 10 (1).

Then, second packet forwarding device #1 performs NAT on a packet serving as a trigger to start a flow, and forwards the resulting packet to the network N2 (2). At this time, the IP address acquired in (1) is used as the source IP address. As a result, a response packet is transmitted to second packet forwarding device #2.

Then, second packet forwarding device #1 shares state information of a filter of second packet forwarding device #1 with second packet forwarding device #2 so that the response packet is not blocked by a filter of second packet forwarding device #2 (3). As the state information of the filter, state information of iptables is used, for example. Second packet forwarding device #2 typically drops packets that are not in the ESTABLISHED state.

Then, second packet forwarding device #1 instructs the first packet forwarding device 20 to use as a forwarding tunnel for the corresponding flow a tunnel for second packet forwarding device #2 (4).

In this way, one second packet forwarding device 30 performs a route control using the source IP address in NAT or NAPT (Network Address Port Translation), thereby making it possible to distribute the new flow to the other second packet forwarding device 30.

<Functional Configuration>

Figure 3:
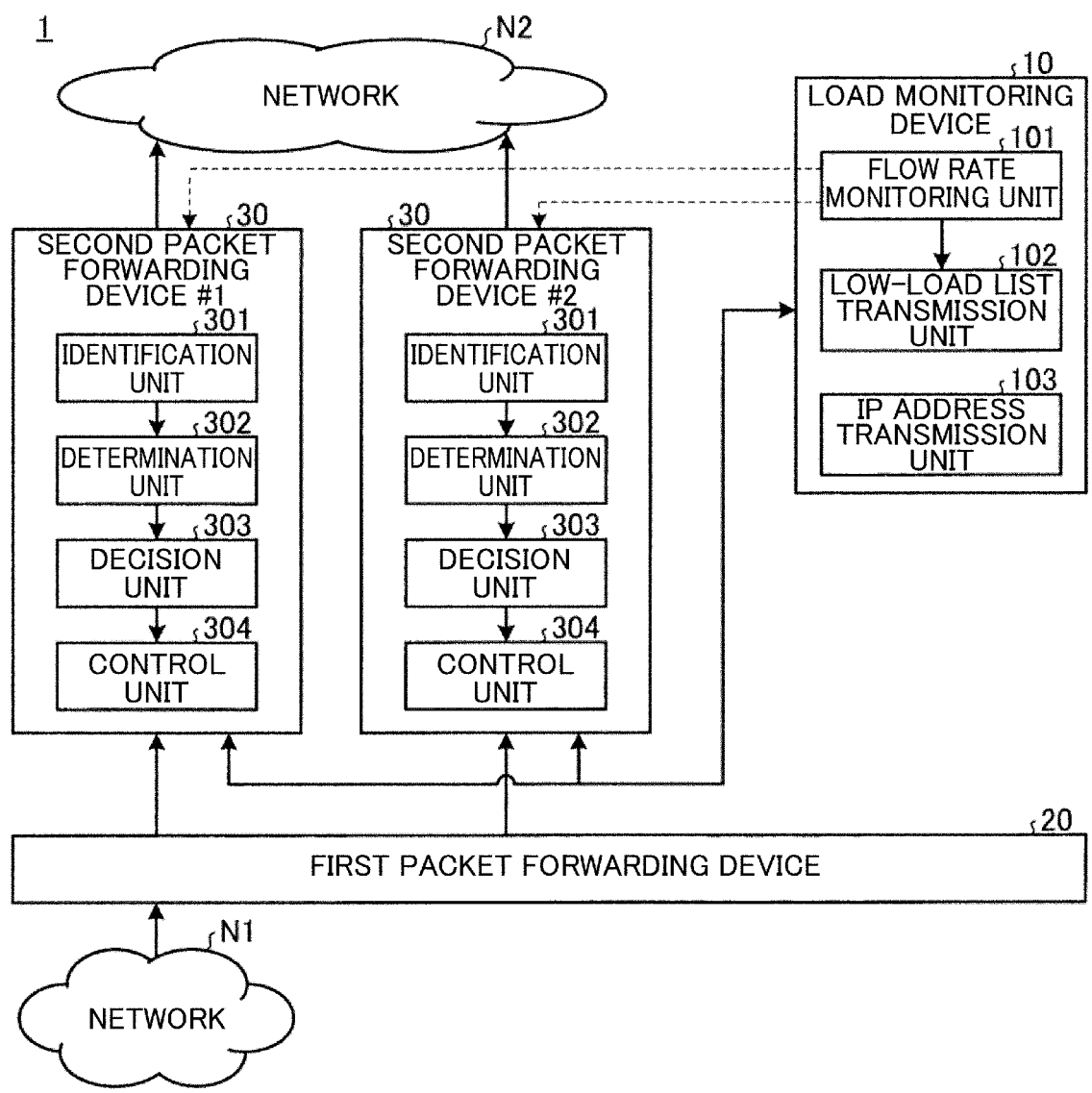
FIG. 3 is a diagram illustrating an example of the functional configuration of the load balancing system according to the first embodiment.

Next, a functional configuration of the load balancing system 1 in the first embodiment will be described with reference to FIG. 3. FIG. 3 is a diagram illustrating an example of the functional configuration of the load balancing system 1 according to the first embodiment.

As illustrated in FIG. 3, the load monitoring device 10 in the first embodiment includes a flow rate monitoring unit 101, a low-load list transmission unit 102, and an IP address transmission unit 103.

The flow rate monitoring unit 101 monitors the traffic flow rate of the second packet forwarding devices 30 from the viewpoints of the amount of data amounts or packet numbers from statistical information of the second packet forwarding devices 30. In other words, the flow rate monitoring unit 101 obtains the data amounts or packet numbers as the monitoring result for each of the second packet forwarding devices 30.

The low-load list transmission unit 102 transmits a list of low-load second packet forwarding devices 30 in response to a request from the second packet forwarding device 30. When the request is for specifying the "amount of data" as the viewpoint, the low-load list transmission unit 102 transmits a list of second packet forwarding devices 30 having a low load in terms of the "amount of data". Further, when the request is for specifying the "number of packets" as the viewpoint, the low-load list transmission unit 102 transmits a list of second packet forwarding devices 30 having a low load in terms of the "number of packets". The low-load list transmission unit 102 creates a list of second packet forwarding devices 30, for example, to be listed in ascending order of load, and transmits it.

In response to the request from the second packet forwarding device 30, the IP address transmission unit 103 transmits the source IP address in NAT of the second packet forwarding device 30 specified in the request.

Further, as illustrated in FIG. 3, each second packet forwarding device 30 in the first embodiment includes an identification unit 301, a determination unit 302, a decision unit 303, and a control unit 304.

When the load is high in terms of the data amounts or packet numbers, the identification unit 301 identifies an application of a new flow and determines the flow characteristic of the new flow. The identification unit 301 identifies the application of the new flow by using, for example, 5-tuple of the packet or L7 information (header information of L7, etc.).

The determination unit 302 determines whether or not distribution of the new flow is necessary based on the type of the high load and the flow characteristic determined by the identification unit 301. The determination unit 302 determines that the distribute of the new flow is necessary when the load is high in terms of the amount of data and the flow characteristic is a high bps flow, and also determines that the distribute of the new flow is necessary when the load is high in terms of packet numbers and the flow characteristic is a high pps flow.

The decision unit 303 acquires a list of low-load second packet forwarding devices 30 from the load monitoring device 10 when the determination unit 302 determines that the distribution of the new flow is necessary. When the flow characteristic of the new flow is a high bps flow, the decision unit 303 transmits a request for a list of low load with the "amount of data" being specified as the viewpoint to the load monitoring device 10. When the flow characteristic of the new flow is a high pps flow, the decision unit 303 transmits a request for a list of low load with the "number of packets" being specified as the viewpoint to the load monitoring device 10.

Then, the decision unit 303 selects one second packet forwarding device 30 from the list of second packet forwarding devices 30 having a low load, and determines the selected second packet forwarding device 30 as the distribution destination. The decision unit 303 determines, for example, the second packet forwarding device 30 at the top of the list as the distribution destination.

The control unit 304 acquires the source IP address in NAT of the second packet forwarding device 30 determined as the distribution destination from the load monitoring device 10, and uses the acquired source IP address to perform NAT on a packet serving as a trigger to start the flow and forward the resulting packet to the network N2. Then, the control unit 304 shares state information of a filter of its own device with the second packet forwarding device 30 determined as the distribution destination. Then, the control unit 304 instructs the first packet forwarding device 20 to use as a forwarding tunnel for the new flow a tunnel for the second packet forwarding device 30 determined as the distribution destination.

<Distribution Processing>

Figure 4:
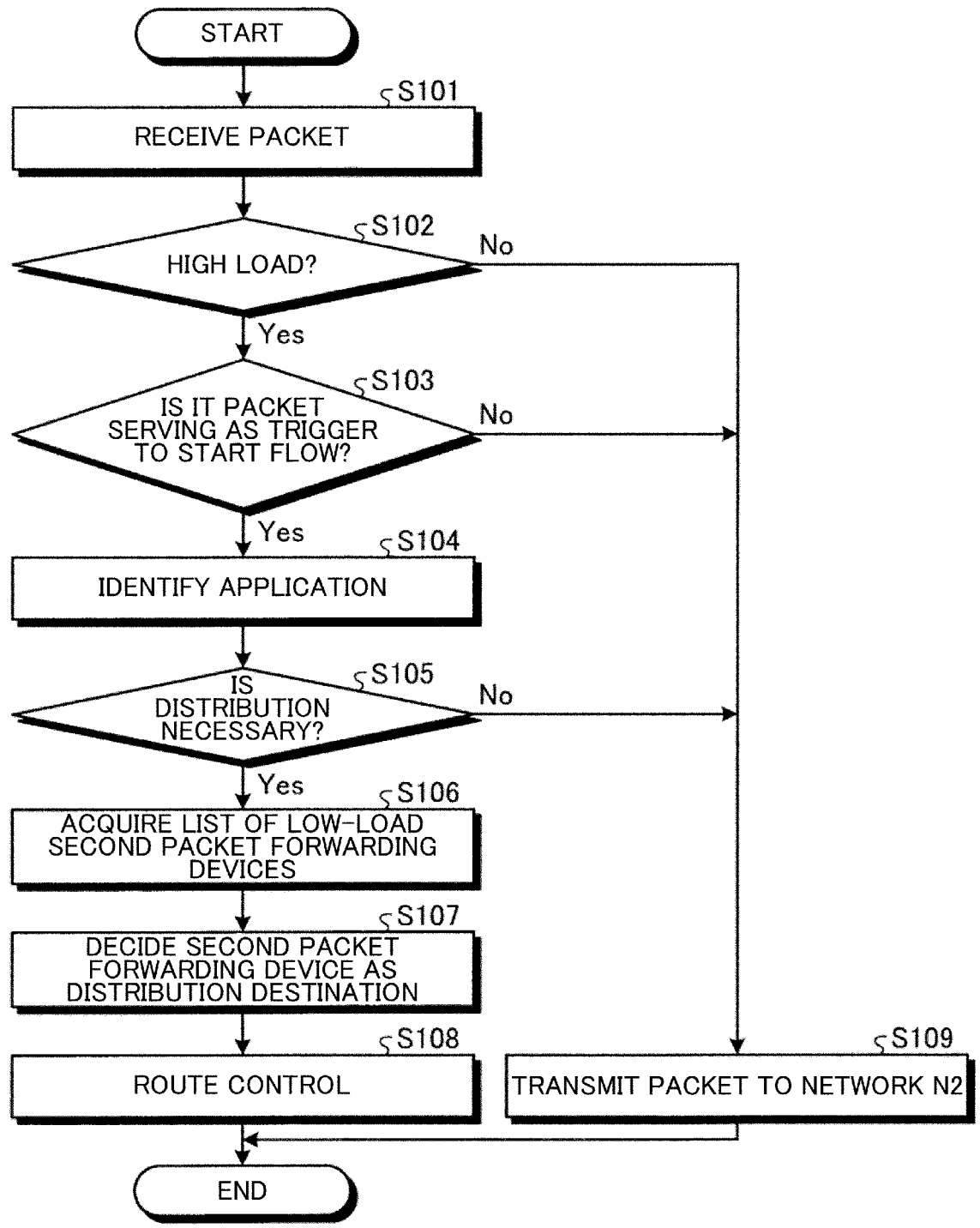
FIG. 4 is a diagram for explaining an example of the flow of distribution processing by the second packet forwarding device in the first embodiment.

Hereinafter, distribution processing by the second packet forwarding device 30 in the first embodiment will be described with reference to FIG. 4. FIG. 4 is a diagram for explaining an example of the flow of distribution processing by the second packet forwarding device 30 in the first embodiment.

First, the second packet forwarding device 30 receives a packet (step S101) and determines whether or not the load is high (step S102). Here, the second packet forwarding device 30 determines whether or not the load is high in terms of the amount of data and whether or not the load is high in terms of packet numbers.

Next, the second packet forwarding device 30 determines whether or not the received packet is a packet serving as a trigger to start a flow when the load is high in terms of the data amounts or packet numbers (step S103).

Next, when the received packet is a packet serving as a trigger to start a flow, the second packet forwarding device 30 identifies an application of the flow (step S104).

Next, the second packet forwarding device 30 determines whether or not distribution is necessary, based on the flow characteristic of the identified application and the type of the high load (step S105). The second packet forwarding device 30 determines that distribution is necessary when the load is high in terms of the amount of data and the flow characteristic of the identified application is a high bps flow. Further, the second packet forwarding device 30 determines that distribution is necessary when the load is high in terms of packet numbers and the flow characteristic is a high pps flow.

Next, when the second packet forwarding device 30 determines that distribution is necessary, the second packet forwarding device 30 acquires a list of low-load second packet forwarding devices 30 from the load monitoring device 10 based on the flow characteristic of the identified application (step S106).

Next, the second packet forwarding device 30 decides a second packet forwarding device 30 as the distribution destination based on the acquired list (step S107), and performs a route control for guiding the flow to the decided second packet forwarding device 30 (step S108).

On the other hand, when the second packet forwarding device 30 determines in step S105 that distribution is not necessary, determines in step S103 that the packet is not a packet serving as a trigger to start a flow, or determines in step S102 that the load is not high, the second packet forwarding device 30 transmits the packet to the network N2 (step S109).

In this way, the second packet forwarding device 30 identifies the application of the new flow, and determines whether or not distribution of the new flow is necessary, based on the flow characteristic of the identified application and the type of the high load. Then, when the second packet forwarding device 30 determines that distribution is necessary, the second packet forwarding device 30 performs a route control to transmit the packet to the distribution destination. Thus, the load balancing system 1 can eliminate the need for the first packet forwarding device 20 to identify the application of the new flow.

<Route Control Processing>

Figure 5:
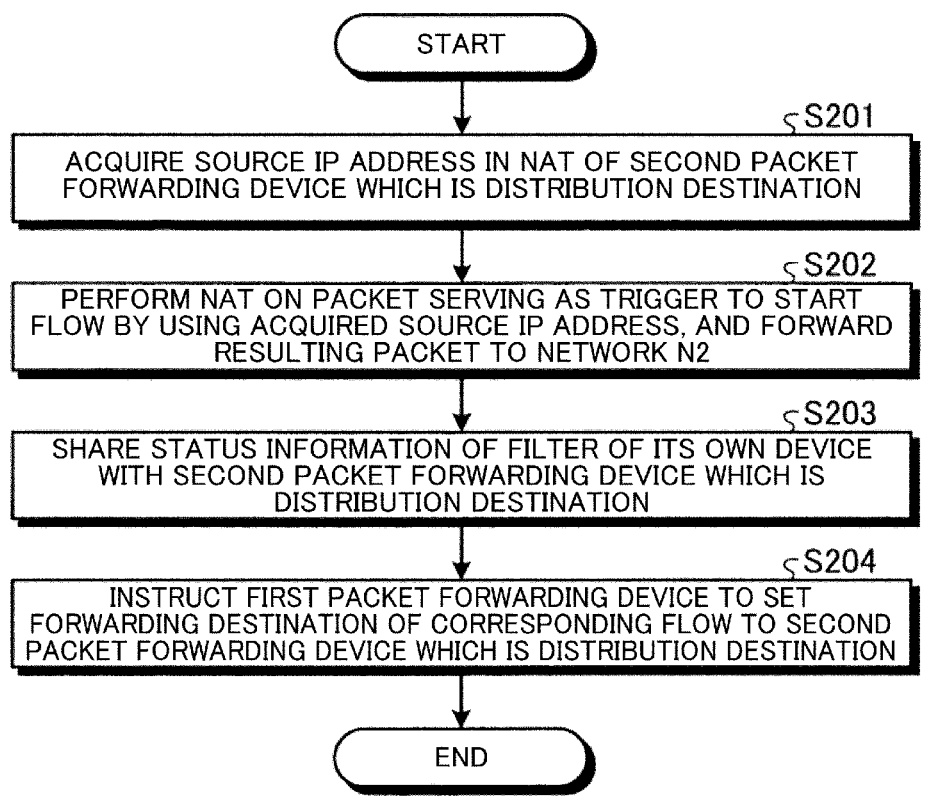
FIG. 5 is a diagram for explaining an example of the flow of route control processing by the second packet forwarding device in the first embodiment.

FIG. 5 is a diagram for explaining an example of the flow of route control processing by the second packet forwarding device 30 in the first embodiment. The processing illustrated in FIG. 5 is processing corresponding to step S108 illustrated in FIG. 4. First, the control unit 304 of the second packet forwarding device 30 acquires the source IP address in NAT of the second packet forwarding device 30 which is the distribution destination (step S201).

Next, the control unit 304 performs NAT on the packet serving as a trigger to start the flow by using the acquired source IP address, and forwards the resulting packet to the network N2 (step S202).

Next, the control unit 304 shares the state information of the filter of its own device with the second packet forwarding device 30 which is the distribution destination (step S203).

Next, the control unit 304 instructs the first packet forwarding device 20 to set the forwarding destination of the flow to the second packet forwarding device 30 which is the distribution destination (step S204).

In this way, the control unit 304 performs the route control for guiding the flow to the second packet forwarding device 30 which is the distribution destination, so that the first packet forwarding device 20 can forward the packet to the second packet forwarding device 30 which is the distribution destination.

As described above, in the load balancing system 1 of the first embodiment, when the load becomes high, the identification unit 301 of the second packet forwarding device 30 identifies an application of a new flow. Then, the determination unit 302 determines whether or not distribution of new flow is necessary, based on the flow characteristic of the application and the type of the high load. Then, when distribution of the new flow is necessary, the decision unit 303 acquires a list of second packet forwarding devices 30 having a low load from the load monitoring device 10, and decides a second packet forwarding device 30 as the distribution destination. Then, the control unit 304 performs a route control for guiding the flow to the second packet forwarding device 30 which is the distribution destination. This makes it possible to eliminate the need for the first packet forwarding device 20 to identify the application of the new flow. Thus, it is possible to prevent an increase in the cost of the first packet forwarding device 20.

Further, the determination unit 302 determines that distribution is necessary when the flow characteristic of the application of the new flow is a high bps flow and the load is high in terms of the amount of data. Further, the determination unit 302 determines that distribution is necessary when the flow characteristic of the application of the new flow is a high pps flow and the load is high in terms of packet numbers. Thus, the second packet forwarding device 30 can perform distribution depending on the flow characteristic of the new flow.

Further, the control unit 304 acquires from the load monitoring device 10 the source IP address that the second packet forwarding device 30 which is the distribution destination uses in NAT, and performs NAT on the acquired source IP address to transmit the packet serving as a trigger for the new flow to the network N2. Then, the control unit 304 shares the status information of the filter with the second packet forwarding device 30 which is the distribution destination, and instructs the first packet forwarding device 20 to transmit the packet of the new flow to the second packet forwarding device 30 which is the distribution destination. Thus, the control unit 304 can guide the new flow to the second packet forwarding device 30 which is the distribution destination.

Second Embodiment

Hereinafter, a second embodiment of the load balancing system 1 according to the embodiments of the present invention will be described. Note that in the second embodiment, the differences from the first embodiment will be mainly described, and the description of the same components as those in the first embodiment will be omitted as appropriate.

<Route Control>

Figure 6:
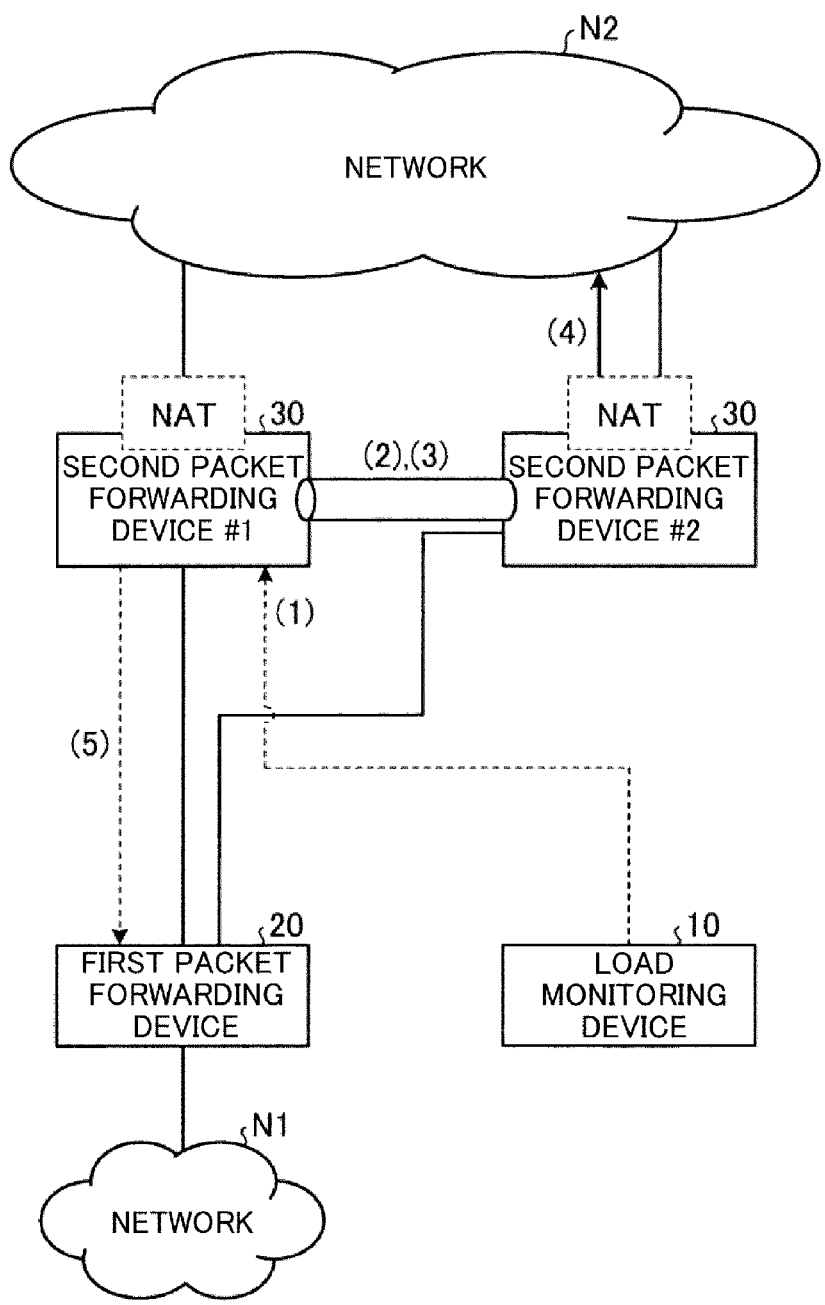
FIG. 6 is a diagram illustrating an example of a route control when a second packet forwarding device in a second embodiment determines that distribution of a new flow is necessary.

First, a route control when a second packet forwarding device 30 in the second embodiment determines that distribution of a new flow is necessary will be described. FIG. 6 is a diagram illustrating an example of the route control when a second packet forwarding device 30 in the second embodiment determines that distribution of a new flow is necessary. As illustrated in FIG. 6, second packet forwarding device #1 acquires information necessary for a tunnel connection with second packet forwarding device #2 from the load monitoring device 10 (1).

Then, second packet forwarding device #1 establishes the tunnel connection with second packet forwarding device #2 based on the acquired information (2). Then, second packet forwarding device #1 forwards a packet serving as a trigger to start a flow to second packet forwarding device #2 via the established tunnel connection (3).

Second packet forwarding device #2 performs NAT on the packet serving as a trigger to start the flow by using its own IP address, and forwards the resulting packet to the network N2 (4). As a result, a response packet is transmitted to Packet forwarding device #2.

Then, second packet forwarding device #1 instructs the first packet forwarding device 20 to use as a forwarding tunnel for the corresponding flow a tunnel for second packet forwarding device #2 (5).

In this way, the second packet forwarding device 30 in the second embodiment performs a route control using the tunnel with the other second packet forwarding device 30 which is the distribution destination, so that the new flow can be distributed to the other second packet forwarding device 30.

<Functional Configuration>

Figure 7:
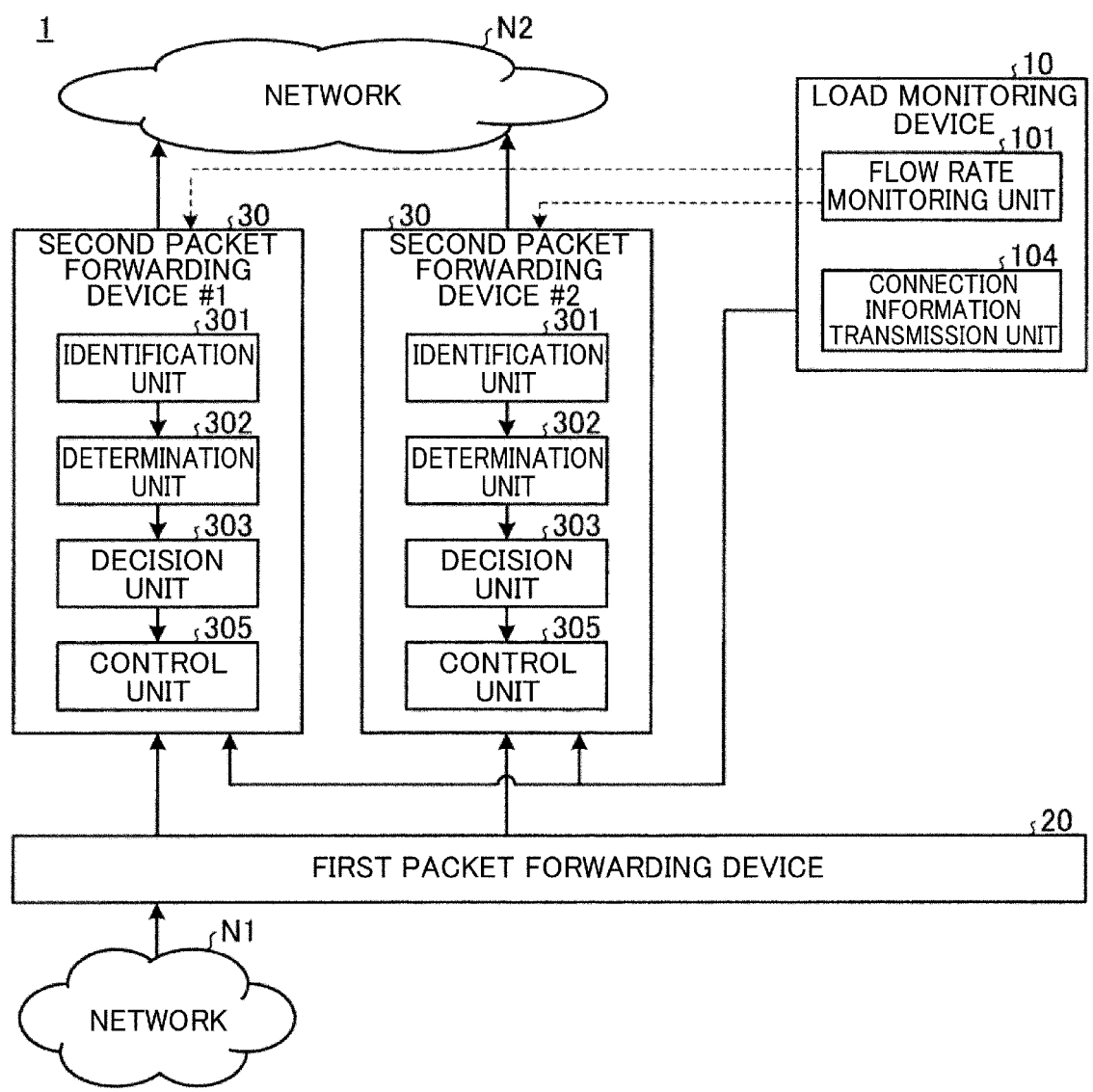
FIG. 7 is a diagram illustrating an example of the functional configuration of the load balancing system according to the second embodiment.

Next, a functional configuration of the load balancing system 1 in the second embodiment will be described with reference to FIG. 7. FIG. 7 is a diagram illustrating an example of the functional configuration of the load balancing system 1 according to the second embodiment.

As illustrated in FIG. 7, a load monitoring device 10 in the second embodiment includes the flow rate monitoring unit 101 and a connection information transmission unit 104. The connection information transmission unit 104 transmits, in response to a request from the second packet forwarding device 30 in the second embodiment, information necessary for a tunnel connection with a second packet forwarding device 30 specified in the request.

Further, the second packet forwarding device 30 in the second embodiment includes the identification unit 301, the determination unit 302, the decision unit 303, and a control unit 305. The control unit 305 acquires information necessary for a tunnel connection with the second packet forwarding device 30 which is the distribution destination from the load monitoring device 10, and establishes the tunnel connection with the second packet forwarding device 30 which is the distribution destination based on the acquired information. Then, the control unit 305 forwards a packet serving as a trigger to start a flow to the second packet forwarding device 30 which is the distribution destination via the established tunnel connection. Then, the control unit 305 instructs the first packet forwarding device 20 to use as a forwarding tunnel for the corresponding flow a tunnel for the second packet forwarding device 30 which is the distribution destination.

<Route Control Processing>

Figure 8:
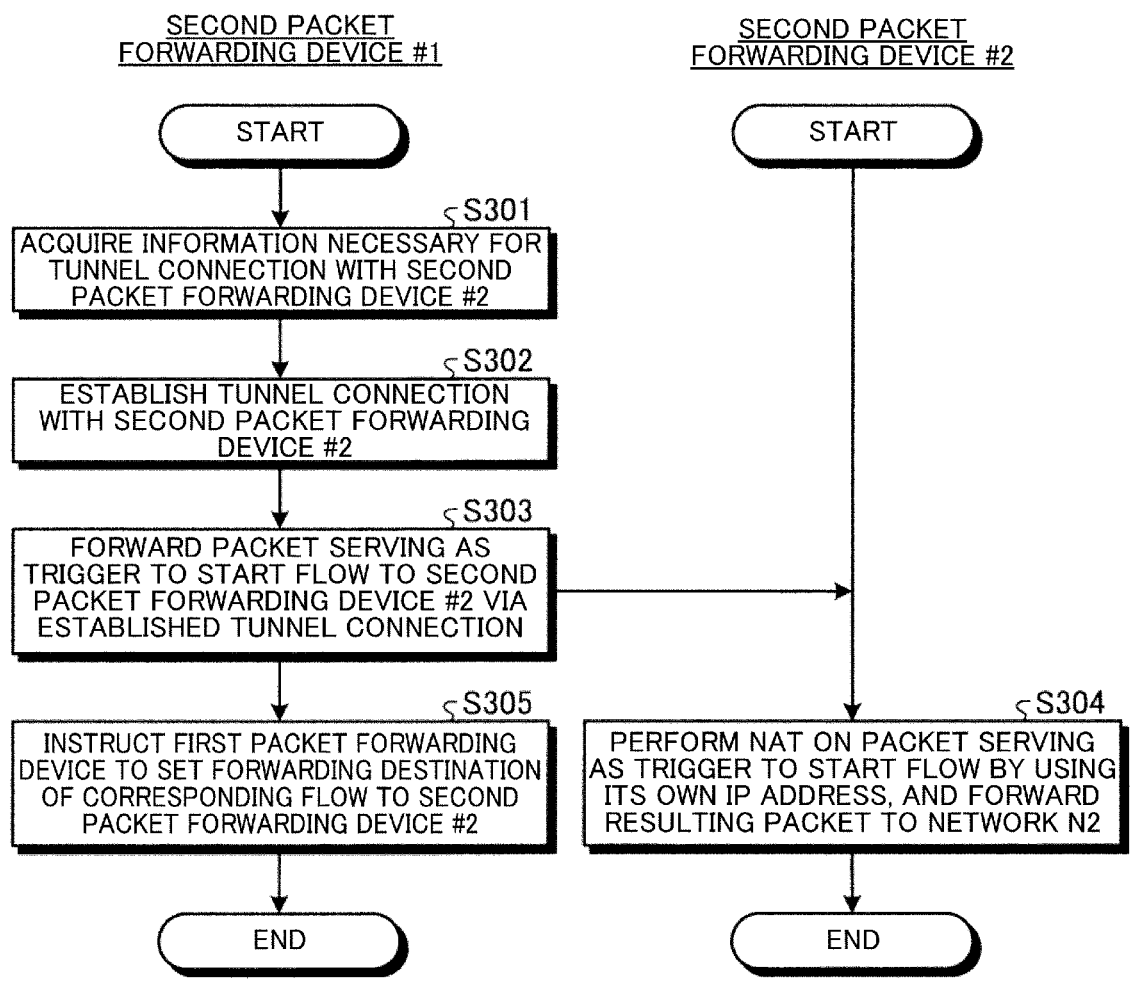
FIG. 8 is a diagram for explaining an example of the sequence of route control processing in the second embodiment.

FIG. 8 is a diagram for explaining an example of the sequence of route control processing in the second embodiment. First, second packet forwarding device #1 acquires information necessary for a tunnel connection with second packet forwarding device #2 from the load monitoring device 10 (step S301), and establishes the tunnel connection with the second packet forwarding device #2 based on the acquired information (step S302).

Next, second packet forwarding device #1 forwards a packet serving as a trigger to start a flow to second packet forwarding device #2 via the established tunnel connection (step S303).

Second packet forwarding device #2 performs NAT on the packet serving as a trigger to start the flow by using its own IP address, and forwards the resulting packet to the network N2 (step S304).

Next, second packet forwarding device #1 instructs the first packet forwarding device 20 to use as a forwarding tunnel for the corresponding flow a tunnel for the second packet forwarding device 30 which is the distribution destination (step S305).

As described above, when a new flow is distributed to another second packet forwarding device 30, the second packet forwarding device 30 in the second embodiment establishes a tunnel connection with the other second packet forwarding device 30 which is the distribution destination. Then, the second packet forwarding device 30 in the second embodiment transmits a packet serving as a trigger for the new flow to the other second packet forwarding device 30 which is the distribution destination via the established tunnel connection. Then, the second packet forwarding device 30 in the second embodiment instructs the first packet forwarding device 20 to use as a forwarding tunnel for the new flow a tunnel for the second packet forwarding device 30 which is the distribution destination. Thus, the second packet forwarding device 30 in the second embodiment can guide the new flow to the second packet forwarding device 30 which is the distribution destination.

<Hardware Configuration>

Figure 9:
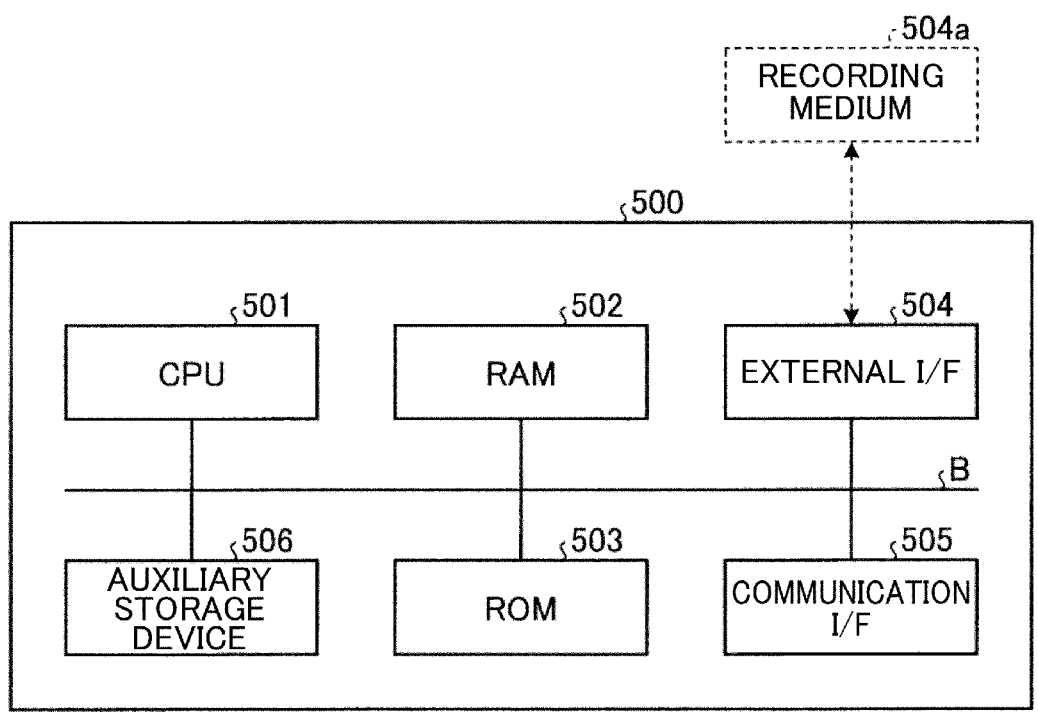
FIG. 9 is a diagram illustrating an example of the hardware configuration of a computer.
Figure 10:
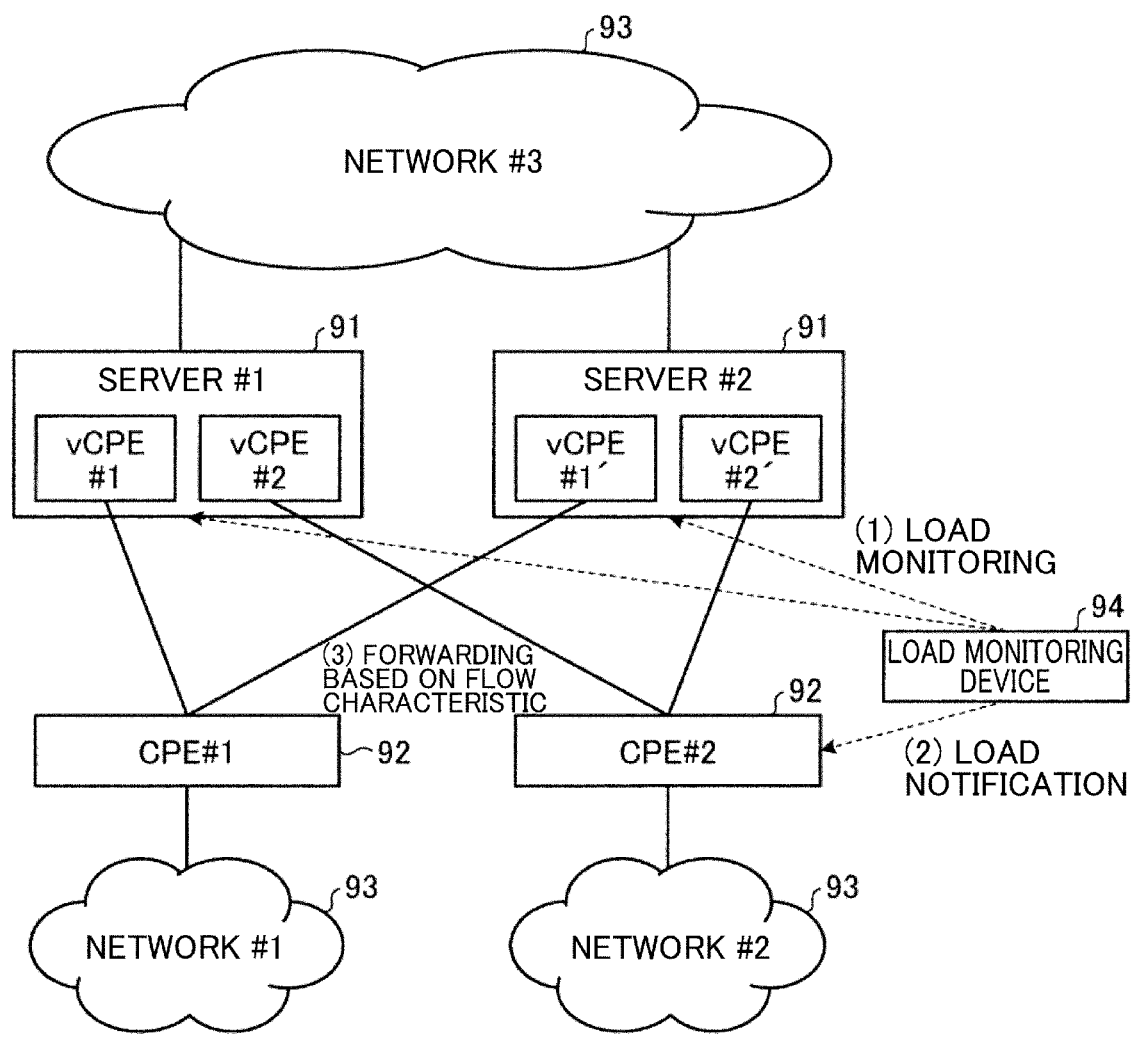
FIG. 10 is a diagram illustrating an example of a load balancing system for balancing the load in consideration of the flow characteristics.

Finally, a hardware configuration of the load monitoring device 10, the first packet forwarding device 20, and the second packet forwarding device 30 according to the embodiments of the present invention will be described. The load monitoring device 10, the first packet forwarding device 20, and the second packet forwarding device 30 according to the embodiments of the present invention are realized by using, for example, one or more computers 500 illustrated in FIG. 9. FIG. 9 is a diagram illustrating an example of the hardware configuration of the computer 500.

The computer 500 illustrated in FIG. 9 includes a CPU (Central Processing Unit) 501, a RAM (Random Access Memory) 502, a ROM (Read Only Memory) 503, an external I/F 504, a communication I/F 505, and an auxiliary storage device 506. The respective pieces of hardware are communicatively connected via a bus B.

The CPU 501 is an arithmetic unit that reads programs and data from the ROM 503, the auxiliary storage device 506, and the like onto the RAM 502 to execute processing.

The RAM 502 is a volatile semiconductor memory that temporarily holds programs and data. The ROM 503 is a non-volatile semiconductor memory that can hold programs and data even when the power is turned off. The ROM 503 stores, for example, OS (Operating System) settings, network settings, and the like.

The external I/F 504 is an interface with an external device. The external device includes a recording medium 504a and the like. The computer 500 can read and write the recording medium 504a and the like via the external I/F 504.

The recording medium 504a includes, for example, a flexible disk, a CD (Compact Disc), a DVD (Digital Versatile Disk), an SD memory card (Secure Digital memory card), a USB (Universal Serial Bus) memory card, and the like.

The communication I/F 505 is an interface for communicating with another device. Note that the first packet forwarding device 20 and the second packet forwarding device 30 each include a plurality of communication I/Fs 505.

The auxiliary storage device 506 is, for example, an HDD (Hard Disk Drive), an SSD (Solid State Drive), or the like, and is also a non-volatile storage device that stores programs and data. The programs and data stored in the auxiliary storage device 506 include, for example, an OS, an application program that implements various functions on the OS, and the like.

The load monitoring device 10, the first packet forwarding device 20, and the second packet forwarding device 30 according to the embodiments of the present invention can execute the various steps of processing described above by using one or more computers 500 illustrated in FIG. 9. For example, each functional unit included in the load monitoring device 10 is implemented by means of processing of causing the CPU 501 or the like to execute one or more programs stored in the auxiliary storage device 506. Further, for example, each functional unit included in the second packet forwarding device 30 is implemented by means of processing of causing the CPU 501 or the like to execute one or more programs stored in the auxiliary storage device 506, or by means of the communication I/F 505 or the like.

Note that the load monitoring device 10 may include at least one of a display device such as a display and an input device such as a keyboard and a mouse.

The present invention is not limited to the embodiments specifically disclosed above, and various modifications and changes can be made without departing from the scope of the claims. In the above-described embodiments, as examples, a packet forwarding device that performs load balancing is the first packet forwarding device 20, and packet forwarding devices that are subjected to load balancing are the second packet forwarding devices 30. However, these examples do not mean that a packet forwarding device always functions as either the first packet forwarding device 20 or the second packet forwarding device 30. For example, the same packet forwarding device may function as the first packet forwarding device 20 and also as the second packet forwarding device 30.

REFERENCE SIGNS LIST

1 Load balancing system
10, 94 Load monitoring device
20 First packet forwarding device
30 Second packet forwarding device
91 Server
92 CPE
93 Network
101 Flow rate monitoring unit
102 Low-load list transmission unit
103 IP address transmission unit
104 Connection information transmission unit
301 Identification unit
302 Determination unit
303 Decision unit
304, 305 Control unit
N1, N2 Network

The invention claimed is:

1. A load balancing system comprising one or more processors configured to: identify an application of a new flow when a load is high in terms of data amounts or packet numbers; determine whether or not distribution of the new flow is necessary, based on a flow characteristic of the application and a determination whether or not the load is high in terms of the data amounts or packet numbers; decide a distribution destination in response to determining that distribution of the new flow is necessary; perform control such that a packet of the new flow is forwarded via the distribution destination; acquire a source IP (Internet Protocol) address used by the distribution destination in NAT (Network Address Translation); perform NAT on a packet serving as a trigger for the new flow to transmit a resulting packet; share state information of a filter with the distribution destination; and instruct a transmission source of the packet serving as a trigger for the new flow to transmit the packet of the new flow to the distribution destination.

2. The load balancing system according to claim 1, wherein the one or more processors are configured to determine that distribution of the new flow is necessary when the flow characteristic of the application is a high-data-amount flow having many long packets and the load is high in terms of data amounts, or when the flow characteristic of the application is a large-number-of-packets flow having many short packets and the load is high in terms of packet numbers.

3. The load balancing system according to claim 1, wherein the one or more processors are configured to: establish a connection with the distribution destination, transmit a packet serving as a trigger for the new flow to the distribution destination via the established connection, and instruct a transmission source of the packet serving as a trigger for the new flow to transmit the packet of the new flow to the distribution destination.

4. The load balancing system according to claim 1, wherein the one or more processors are configured to:
receive a packet from a first network;
receive the packet from a first packet forwarding device;
transmit the packet to a second network, wherein each second packet forwarding device includes an identification unit, a determination unit, a decision unit, and a control unit, the distribution destination is another second packet forwarding device, and
instruct the first packet forwarding device to transmit a packet of the new flow to the distribution destination.

5. A load balancing method comprising: identifying an application of a new flow when a load is high in terms of data amounts or packet numbers; determining whether or not distribution of the new flow is necessary, based on a flow characteristic of the application and a determination whether or not the load is high in terms of data amounts or packet numbers; deciding a distribution destination in response to determining hat distribution of the new flow is necessary; performing control such that a packet of the new flow is forwarded via the distribution destination; acquiring a source IP (Internet Protocol) address used by the distribution destination in NAT (Network Address Translation); performing NAT on a packet serving as a trigger for the new flow to transmit a resulting packet; sharing state information of a filter with the distribution destination; and instructing a transmission source of the packet serving as a trigger for the new flow to transmit the packet of the new flow to the distribution destination.

6. The load balancing method of claim 5, further comprising:
determining that distribution of the new flow is necessary when the flow characteristic of the application is a high-data-amount flow having many long packets and the load is high in terms of data amounts, or when the flow characteristic of the application is a large-number-of-packets flow having many short packets and the load is high in terms of packet numbers.

7. The load balancing method of claim 5, further comprising:
  establishing a connection with the distribution destination;
  transmitting a packet serving as a trigger for the new flow to the distribution destination via the established connection; and
  instructing a transmission source of the packet serving as a trigger for the new flow to transmit the packet of the new flow to the distribution destination.

8. The load balancing method of claim 5, further comprising:
  receiving, at a first packet forwarding device, a packet from a first network;
  receiving, from the first packet forwarding device and at a plurality of second packet forwarding devices, the packet; and
  transmitting the packet to a second network, wherein each second packet forwarding device includes an identification unit, a determination unit, a decision unit, and a control unit, the distribution destination is another second packet forwarding device, and instructing the first packet forwarding device to transmit a packet of the new flow to the distribution destination.

9. A non-transitory computer readable medium storing one or more instructions causing a computer to execute: identifying an application of a new flow when a load is high in terms of data amounts or packet numbers; determining whether or not distribution of the new flow is necessary, based on a flow characteristic of the application and a determination whether or not the load is high in terms of data amounts or packet numbers; deciding a distribution destination in response to determining that distribution of the new flow is necessary; performing control such that a packet of the new flow is forwarded via the distribution destination; acquiring a source IP (Internet Protocol) address used by the distribution destination in NAT (Network Address Translation); performing NAT on a packet serving as a trigger for the new flow to transmit a resulting packet; sharing state information of a filter with the distribution destination; and instructing a transmission source of the packet serving as a trigger for the new flow to transmit the packet of the new flow to the distribution destination.

10. The non-transitory computer readable medium according to claim 9, further comprising:
  determining that distribution of the new flow is necessary when the flow characteristic of the application is a high-data-amount flow having many long packets and the load is high in terms of data amounts, or when the flow characteristic of the application is a large-number-of-packets flow having many short packets and the load is high in terms of packet numbers.

11. The non-transitory computer readable medium according to claim 9, further comprising:
  establishing a connection with the distribution destination;
  transmitting a packet serving as a trigger for the new flow to the distribution destination via the established connection; and
  instructing a transmission source of the packet serving as a trigger for the new flow to transmit the packet of the new flow to the distribution destination.

12. The non-transitory computer readable medium according to claim 9, further comprising:
  receiving, at a first packet forwarding device, a packet from a first network;
  receiving, from the first packet forwarding device and at a plurality of second packet forwarding devices, the packet; and
  transmitting the packet to a second network, wherein each second packet forwarding device includes an identification unit, a determination unit, a decision unit, and a control unit, the distribution destination is another second packet forwarding device, and instructing the first packet forwarding device to transmit a packet of the new flow to the distribution destination.

* * * * *